United States Patent
Kanazawa et al.

(10) Patent No.: US 6,553,606 B1
(45) Date of Patent: Apr. 29, 2003

(54) MOTOR DEVICE TO BE EASILY FIXED TO FRAME

(75) Inventors: Keisuke Kanazawa, Hamamatsu (JP); Naohito Yamamoto, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/537,233

(22) Filed: Mar. 28, 2000

(30) Foreign Application Priority Data

May 28, 1999 (JP) ............................................. 11-149955

(51) Int. Cl.⁷ ................................................. B60S 1/06
(52) U.S. Cl. ..................... 15/250.31; 310/91; 74/606 R; 15/250.3
(58) Field of Search ........................... 15/250.3, 250.31; 296/96.1 R, 192; 74/606 R; 310/89, 91

(56) References Cited

U.S. PATENT DOCUMENTS

| | | | |
|---|---|---|---|
| 5,222,706 A | 6/1993 | Hoshino | 15/250.31 |
| 5,261,286 A | 11/1993 | Hayashi | 15/250.3 |
| 5,441,227 A | * 8/1995 | Hayashi | 15/250.3 |

FOREIGN PATENT DOCUMENTS

| | | |
|---|---|---|
| FR | 2551811 | 3/1985 |
| FR | 2761318 | 10/1998 |
| FR | 2767102 | 2/1999 |
| GB | 2325617 | 12/1998 |
| JP | 63-104314 | 3/1990 |
| JP | U-5-40063 | 5/1993 |
| JP | A-9-191595 | 7/1997 |
| JP | 2000-38117 | 2/2000 |

* cited by examiner

*Primary Examiner*—Gary K. Graham
(74) *Attorney, Agent, or Firm*—Posz & Bethards, PLC

(57) ABSTRACT

In a motor device having a motor, a reduction mechanism and a housing with an installation leg integrally formed therewith by a pair of dies parting in an axial direction of an output shaft of the reduction mechanism, the installation leg is composed of a side surface coming in surface contact with a frame, a first recess portion for holding a nut whose entire inner surface is opened at least on one side of the housing in a die parting direction of the dies and a second recess portion for inserting a bolt whose entire inner surface is opened on the other side of the housing in the die parting direction of the dies and which extends from the side surface to the first recess portion nearly perpendicularly to the axial direction of the output shaft. By inserting a bolt into the second recess portion through the installation hole of the frame and screwing the bolt into a nut housed in the first recess portion, the housing is fixed to the frame.

11 Claims, 9 Drawing Sheets

MOTOR DEVICE TO BE EASILY FIXED TO FRAME

CROSS REFERENCE TO RELATED APPLICATION

This application is based upon and claims the benefit of priority of Japanese Patent Application No. H.11-149955 filed on May 28, 1999, the content of which is incorporated herein by reference.

BACKGROUND OF THE INVENTION

1. Field of the Invention

The present invention relates to a motor device having a motor and a rotation speed reduction mechanism for driving a wind shield wiper with a construction that the motor device is easily fixed to a wiper frame.

2. Description of Related Art

In a conventional motor device having a gear housing in which a reduction mechanism for reducing a rotation speed of a motor is housed, the gear housing is generally made through forming processing such as aluminum die-casting or resin molding. As it is necessary to form a shaft hole by which an output shaft of the reduction mechanism is held so as to penetrate through the gear housing, the gear housing is formed preferably in a manner that dies to be used for the forming processing may be parted in an axial direction of the output shaft thereof.

On the other hand, as shown in FIG. 9, the gear housing 100 is provided with installation legs 104 for fixing the motor device. The installation legs 104 are fixed to a flat surface portion 102A of a frame 102 having a one side open square shaped cross section. Each of the installation legs 104 is provided with a through hole 108 into which a bolt 106 is inserted on fixing to the frame 102. The through hole 108 is formed to extend in a direction same as the direction in which the dies are parted in view of easily splitting out the dies after forming. When the gear housing 100 is fixed to the flat surface portion 102A of the frame 102 by the bolt 106 and a nut 110, it is preferable, as shown in FIG. 10, that the flat surface portion 102A is faced in parallel with the output shaft of the reduction mechanism in consideration of a strength of the frame 120 for supporting the wiper device.

In the case that the gear housing 100 is fixed to the flat surface portion 102A faced in parallel with the output shaft of the reduction mechanism, the gear housing 100 may be provided, as shown in JP-U-5-40063, separately with a bracket made by press forming a plate in a given shape. However, this causes a problem that more manufacturing time and component parts are required, resulting in more manufacturing cost.

Further, to solve the above problem, if the gear housing 100 is provided integrally with installation legs 114 having through holes 112 extending perpendicularly to the output shaft of the gear housing 100, as shown in FIG. 10, the through holes 112 may not be formed in the gear housing 100 simply by upper and lower dies. In this case, a moving core in the dies becomes necessary for forming the through holes 112 so that the construction of the dies becomes complicated.

Further, as a process for fixing the gear housing 100 to the frame 102, at first, while the nut 110 is held in one hand, the bolt 106 have to be inserted into the through hole 112 and be tentatively screwed into the nut 110. Then, the bolt 106 is rigidly fastened with the nut 110 by a fastening tool. As a result, not only the fastening process becomes troublesome but also the nut 110 is likely to fall down during the fixing work.

SUMMARY OF THE INVENTION

The present invention has been made in view of the above mentioned problem, and an object of the present invention is to provide a motor device having a reduction mechanism in which an installation leg with a through hole formed nearly perpendicularly to an axis of an output shaft of the reduction mechanism is integrally formed with a gear housing without using a special moving core. As a result, while the manufacturing cost becomes less, a work for fixing the gear housing to a frame becomes easier.

To achieve the above object, the motor device is comprised of a motor, a reduction mechanism having an output shaft and a housing with an installation portion for housing the reduction mechanism so as to have the output shaft penetrate therethrough. The housing is formed integrally with the installation portion by a pair of dies parting in an axial direction of the output shaft.

The installation portion is composed of a side surface coming in surface contact with a seat surface of the frame, a first recess portion for holding a nut whose entire inner surface is opened at least on one side of the housing in the axial direction of the output shaft and a second recess portion for inserting a bolt whose entire inner surface is opened on the other side of the housing in the axial direction of the output shaft and which extends from the side surface to the first recess portion nearly perpendicularly to the axial direction of the output shaft.

According to the construction mentioned above, since the inner surfaces of the first and second recess portions are opened in a parting direction of the dies, respectively, for example, since the first recess portion may be formed by an upper die and the second recess portion may be formed by a lower dies, a through hole extending nearly perpendicularly to the parting direction of the dies may be formed as the second recess portion between the first recess portion and the frame. Therefore, the housing may be fixed to the frame by inserting the bolt through a penetrating hole of the frame into the second recess portion and screwing the bolt into the nut housed in the first recess portion.

As mentioned above, even if the second recess portion constituting the through hole is shaped nearly perpendicular to the axial direction of the output shaft, the through hole may be formed merely by the upper and lower dies without using a moving core. As a result, the housing may be easily manufactured at lower cost.

Preferably, the inner surface has a nut holding surface opened only on the one side of the housing in an opposing direction to a gravity so that, just by dropping the nut into the first recess portion, the nut may be housed in the first recess portion with its own weight. This makes the fastening work easier.

Further, it is preferable that the inner surface of the first recess portion has a retaining surface coming in contact with an outer surface of the nut and preventing the nut from rotating together with the bolt when the bolt is screwed into the nut. This construction serves to fix easily the housing to the frame without holding the nut in one hand.

Furthermore, preferably, the first recess portion is provided at the inner surface on a side opposite to the second recess portion with a concave portion at which a leading end of the bolt is housed when the bolt is fastened to penetrate through the nut. With the concave portion, the bolt may be further screwed into the nut even after the leading end of the bolt penetrates through the nut. As a result, the motor device may be reliably fixed to the frame irrevernt to a length of the bolt.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
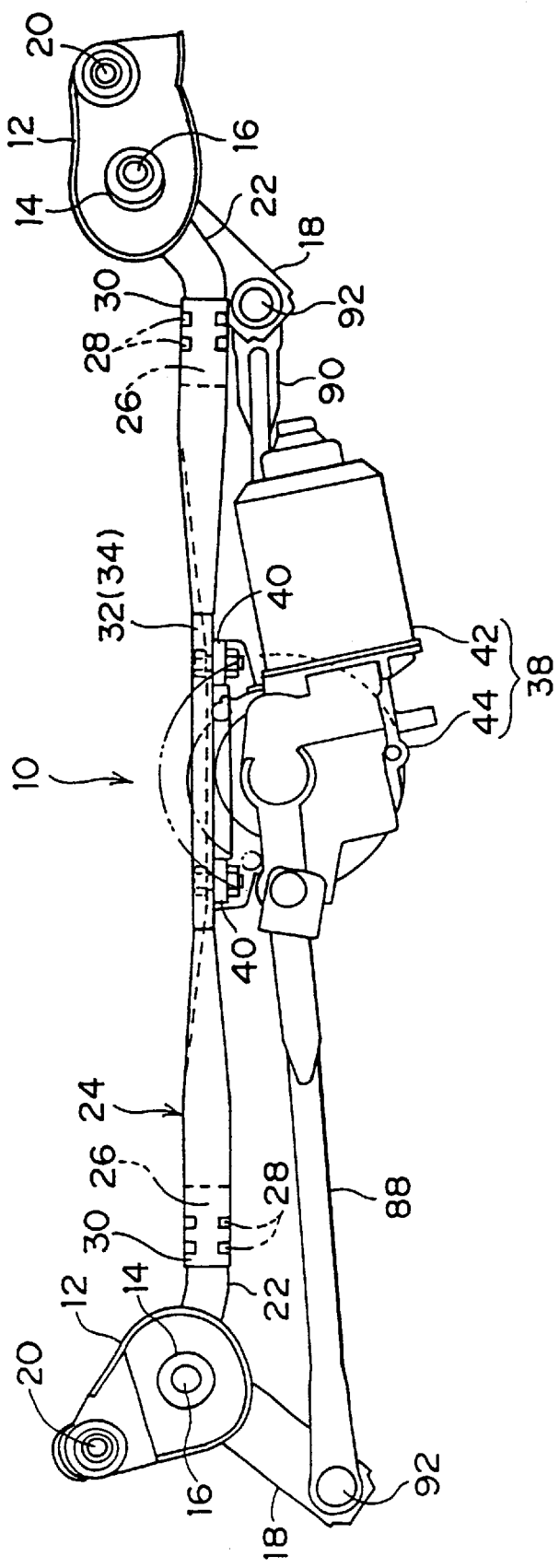
FIG. 1 is a plan view showing a whole structure of the wiper apparatus with a motor device according to a first embodiment of the present invention.

A preferred embodiment of the present invention is described hereinafter according to FIGS. 1 to 2.

A wiper device 10 has a pair of pivot holders 12. Each of the pivot holders 12 is provided with a cylindrical portion 14 into which a pivot shaft 16 is inserted and which rotatably supports the pivot shaft 16. A pivot lever 18 is fixed to a leading end of the pivot shaft 16 so that the pivot shaft 16 may rotate according to a swinging movement of the pivot lever 18.

Installation holes 20 are formed at corners of the respective pivot holders 12. The wiper device 10 is fixed to a vehicle body by fastening bolts inserted into the respective installation holes 20, as shown in FIG. 2.

Each of pivot holders 12 is provided with a connecting shaft 22 on a side opposite to the installation hole 20. The connecting shaft 22 is a circular cross sectional pure shaft and has at the leading end thereof a first connecting portion 26 to be fitted into a pipe frame 24 to be described later.

The connecting portions 26 are respectively provided with concave 28. The connecting shaft 22 is not limited to the circular cross sectional pure shaft but may be a ring shaped cross sectional pipe shaft.

The pipe frame 24 has at each of both longitudinal ends thereof a second connecting portion 30, which corresponds to the connecting shaft 22. The second connecting portion 30 has a ring shaped cross section and is fitted with and fixed to the first connecting portion 26 of the connecting shaft 22 by caulking at the places of the concave 28.

Figure 6:
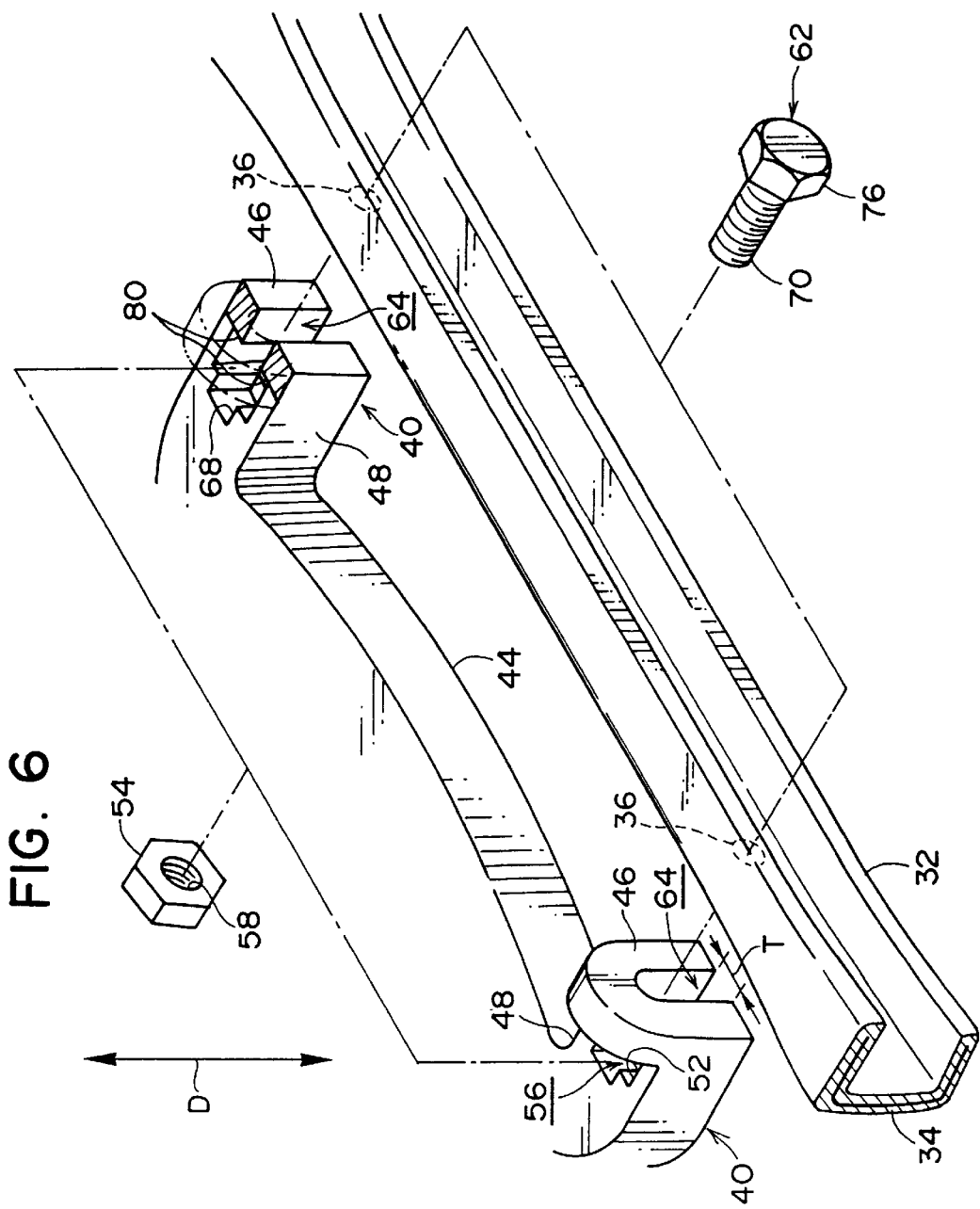
FIG. 6 is an exploded partial view showing a state that the motor device according to the first embodiment of the present invention is installed on a frame.

The pipe frame 24 has an installation base 32 at a longitudinal intermediate portion. As shown in FIG. 6, the installation base 32 has a one side open square shaped cross section and one side surface of the installation base 32 constitutes a flat installation seat 34. Though a longitudinal center portion of the pipe frame 24 has the one side open square shaped cross section formed by pressing without hollowness, the other longitudinal portion of the pipe frame 24 has a cross section having a hollowness, a shape of which is gradually variable toward opposite longitudinal ends of the pipe frame 24, and each of the connecting portions 26 at the opposite longitudinal ends thereof has a ring shaped cross section. Further, as shown in FIG. 6, the installation base 32 is provided with a pair of installation holes 36 at positions corresponding to those of through holes 64 to be described later for fixing a driving source to be also described later. In place of the installation holes 36, the installation base 32 may be provided with an installation groove extending in a longitudinal direction thereof so that a fixing position of the driving source relative to the installation base 32 may be adjustable in a longitudinal direction of the installation base 32.

A motor device 38 as the driving source is mounted on the flat installation seat 34 at the installation base 32 of the pipe frame 24. The motor device 38 is composed of a motor 42, a reduction mechanism (not shown) having an output shaft 82 and integrally provided with the motor 42 for reducing a rotation speed of the motor 42 with gears and a gear housing 44 for housing the reduction mechanism so as to have the output shaft 82 penetrate therethrough. The gear housing 44 is provided with a pair of installation legs 40 formed integrally with and protruding from the gear housing 44 for mounting the motor device 38 on the flat installation seat 34.

A more detail construction of the installation legs 40 integrally formed in the gear housing 44 is described hereinafter.

Figure 3:
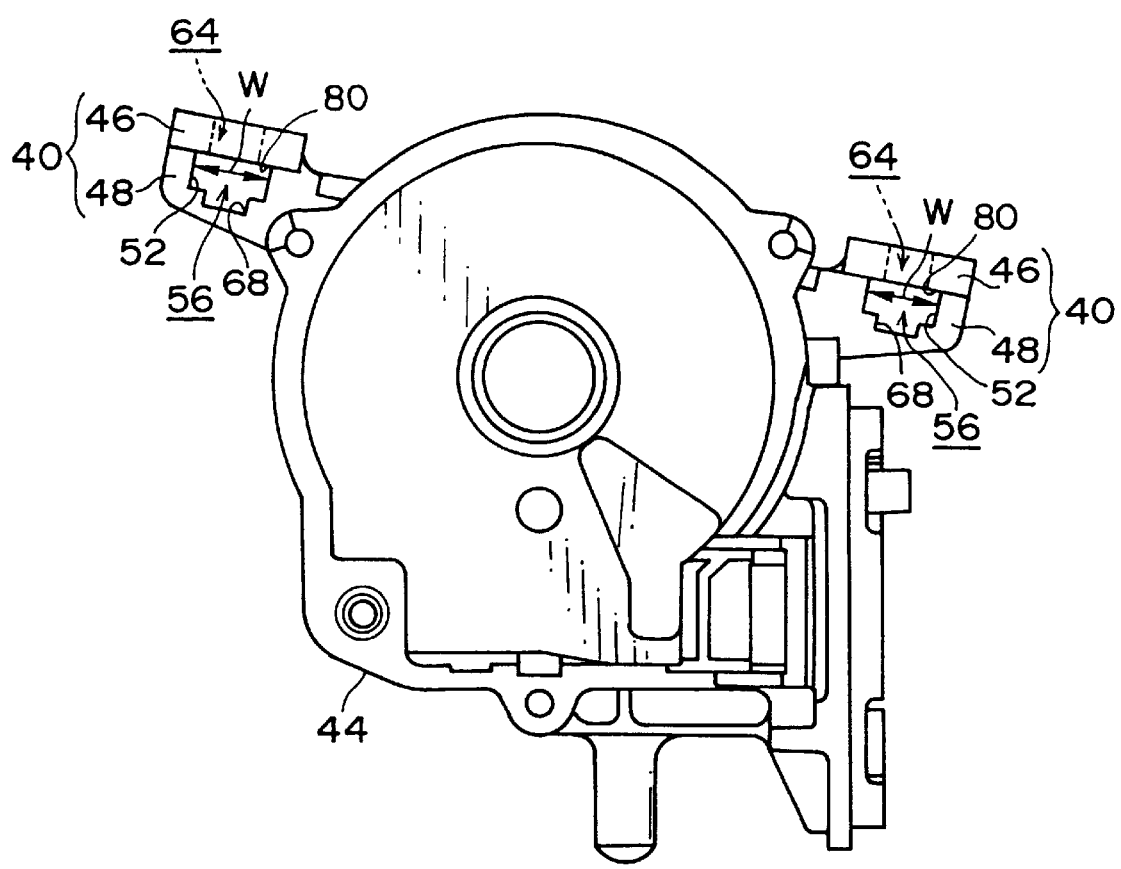
FIG. 3 is a top view showing a gear housing constituting the motor device according to the first embodiment of the present invention.
Figure 4:
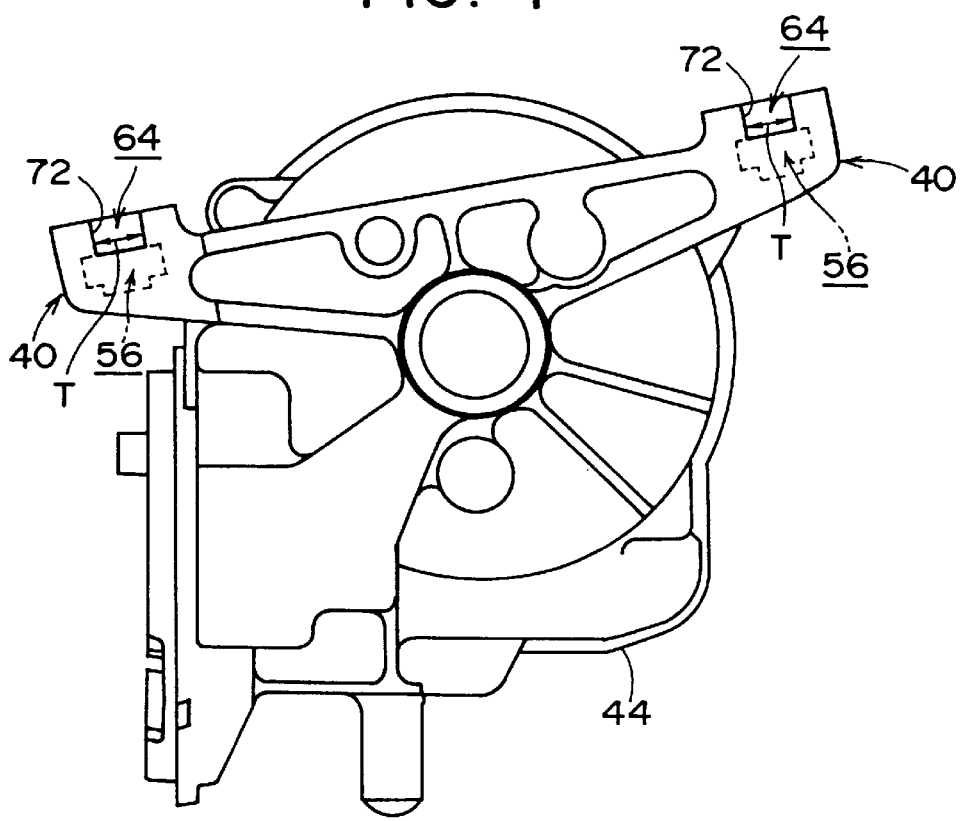
FIG. 4 is a bottom view showing the gear housing constituting the motor device according to the first embodiment of the present invention.
Figure 5:
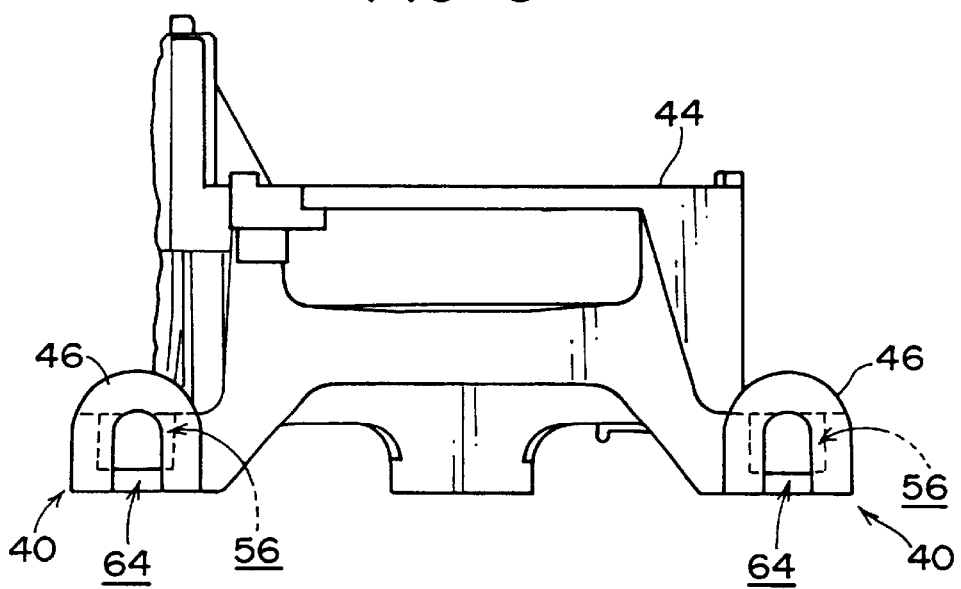
FIG. 5 is a side view showing the gear housing constituting the motor device according to the first embodiment of the present invention.

FIG. 3 shows a top plan view of a whole structure of the gear housing 44A, FIG. 4 shows a bottom view thereof and FIG. 5 shows a side view thereof, respectively.

As shown in FIGS. 3 to 5, the installation legs 40 are formed at opposite side portions of the gear housing 44. As the respective structures of the installation legs 40 are similar to each other, only one of the installation legs 40 is described below. The installation leg 40 is composed of a rectangular parallelepiped body portion 48 and an installation piece 46 formed at a leading end of the body portion 48 so as to extrude therefrom.

Figure 7:
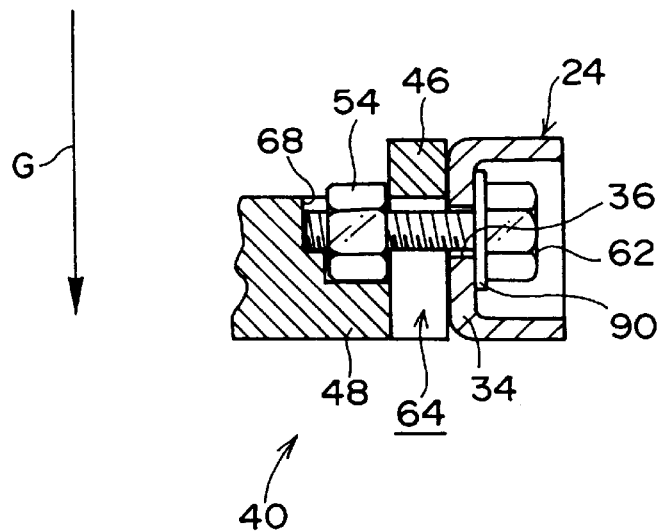
FIG. 7 is a cross sectional partial view showing the state that the motor device according to the first embodiment of the present invention is installed on the frame.

Further, as shown in FIGS. 6 and 7, the body portion 48 is provided with a nut holding portion 56 having an opening 52 opened on one side of the body portion 48 in one (C1 direction in the drawing) of opposite directions (C1 and C2 directions in the drawing) in which a pair of dies 50 are parted when the gear housing 44 is formed.

When the gear housing 44 is installed on the pipe frame 24, as shown in FIG. 6, the installation piece 46 comes in face contact with the flat installation seat 34 and is fixed thereto by a fastening force acting perpendicularly to an axial direction of the output shaft 82 of the reduction mechanism (in D direction in the drawing). At this time, the nut holding portion 56 is so arranged on one side of the gear housing 44 that the opening 52 of the nut holding portion 56 is opened in an opposing direction to a gravity.

Then, as shown in FIGS. 6 and 7, a hexagon nut 54 having a fastening hole 58 is inserted into the nut holding portion 56 through the opening 52 and the nut 54 is held by the nut holding portion 56 in a state that the fastening hole 58 faces in a direction nearly perpendicular to an axis of the output shaft 82 (refer to FIG. 2) of the reduction mechanism.

The nut holding portion 56 is formed by an upper side die 60 of the dies 50. As shown in FIG. 3, a distance W between opposite inner walls (the opening 52) of the nut holding portion is equal to or slightly larger than a minimum outer diameter (width across flats) of the nut 54 but smaller than a maximum outer diameter (width across corners) of the nut 54. The opposite inner walls of the nut holding portion 56 comes in contact with outer circumference surface of the nut 54 inserted therein and serves to prevent the nut 54 from rotating together with a volt 62 (refer to FIG. 6) when the bolt 62 is screwed into the nut 54.

The nut holding portion 56 is formed in such a shape that the nut 54 may be nearly entirely housed in the nut holding portion 56 but the nut 54 may not pass through the body portion 48 due to a nut holding surface 57 (refer to FIG. 8) opened only on one side of the body portion 48 in an axial direction of the output shaft 82. Unless the nut 54 may not pass through the body portion 48, the nut holding portion 56 may be partly opened on the other side of the body portion 48 in an axial direction of the output shaft 82, too. Therefore, the nut 54 inserted in the nut holding portion 56 from the one side of the body portion 40 does not fall down, even if the nut 54 is not held in one hand.

Further, a concave portion 68 is provided at a bottom wall of the nut holding portion 56 on a side opposite to the through hole 64 through which the bolt 62 is inserted. The concave portion 68 may house a leading end of the bolt 62 that penetrates through the nut 54.

On the other hand, the installation piece 46 is provided with a through hole 64 having an opening 72 opened in the other (C2 direction) of the opposite directions in which the dies 50 are parted. By integrally forming the nut holding portion 56 and the through hole 64 with the dies 50, the nut holding portion 56 and the through hole 64 constitute a communication path extending in a direction perpendicular to the axial direction D (die parting directions C1 and C2 of the dies 50) of the output shaft 82.

The through hole 64 is formed in a letter U groove shape by a lower die 74 of the dies 50. A width T (corresponding to a width T of the opening 72) of the through hole 64 is smaller than a minimum diameter (with across flats) of a hexagon head 76 of the bolt 62 and also smaller than a width W (corresponding to a width T of the opening 52) of the nut holding portion 56 and smaller than the minimum outer diameter of the nut 54. Therefore, when the bolt 62 is screwed into the nut inserted into the nut holding portion 56 through the installation hole 36 and the through hole 64, a side surface of the nut 54 comes partly in contact with an inner wall 80 (refer to FIG. 6) of the nut holding portion on a side of the through hole 64 and a further movement of the nut 54 is stopped thereby. As a result, the gear housing 44 of the motor device 38 is firmly fixed to the flat installation seat 34 of the pipe frame 24.

Figure 2:
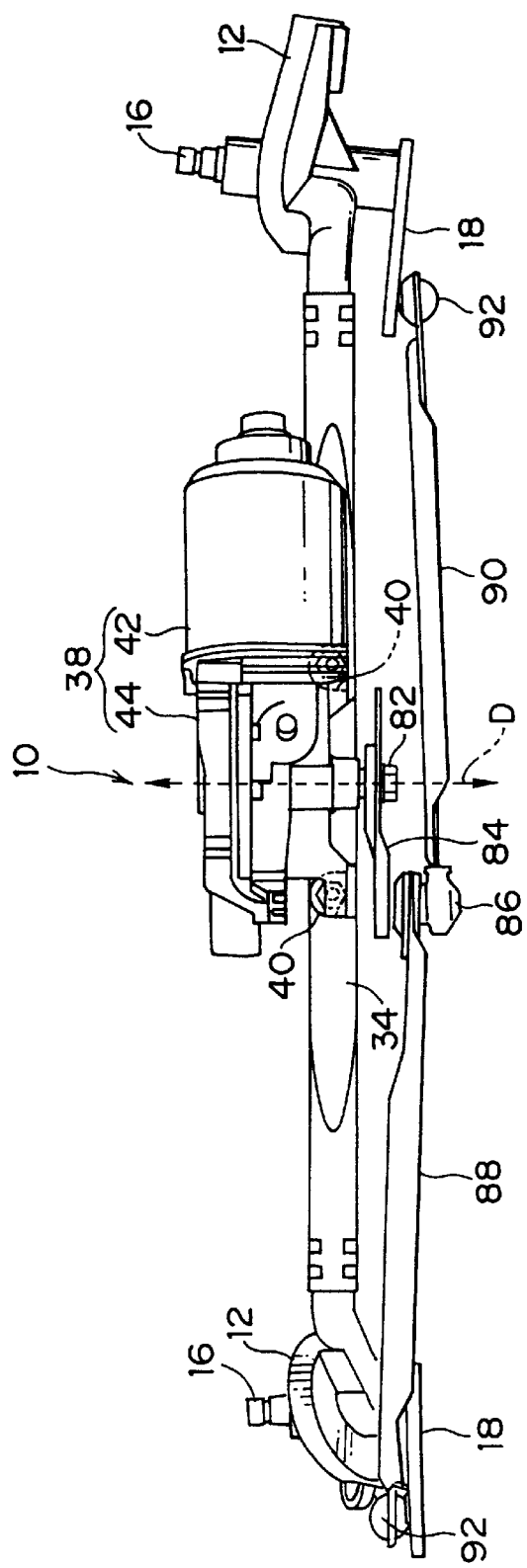
FIG. 2 is a front view showing the whole structure of the wiper apparatus with the motor device according to the first embodiment of the present invention.

Further, as shown in FIG. 2, a crank arm 84 is fixed to a leading end of the output shaft 82 of the motor device 38. First and second link rods 88 and 90 are connected to a leading end of the crank arm 84 via a joint portion 86. The first link rod 88 is connected via a ball joint 92 to the pivot lever 18 at the leading end of the pivot shaft 16 held by the pivot holder 12. The second link rod 90 is also connected via a ball joint 92 to the pivot lever 18 at the leading end of the pivot shaft 16 held by the pivot holder 12.

In the wiper apparatus 10 mentioned above, a rotation of the crank arm 84 driven by the motor 42 is transmitted to the respective pivot shafts 16 via the respective first and second link rods 88 and 90 and the respective pivot levers 18 so that a pair of blades and arms (not shown) attached to the respective pivot shafts 16 may make swing movements at places apart from each other. The crank arm 84, the first and second link rods 88 and 90 and the pivot levers 18 constitute a link mechanism.

A function of the motor device 38 is described.

The installation legs 40 are formed integrally with the gear housing 44 by an aluminum die casting method. That is, the installation legs 40, as shown in FIG. 8, are formed by the dies 50 that may be parted in the axial direction of the output shaft 82 of the reduction mechanism and the nut holding portion 56 is formed by the upper die 60 and the through 63 is formed by the lower die 74.

Figure 8:
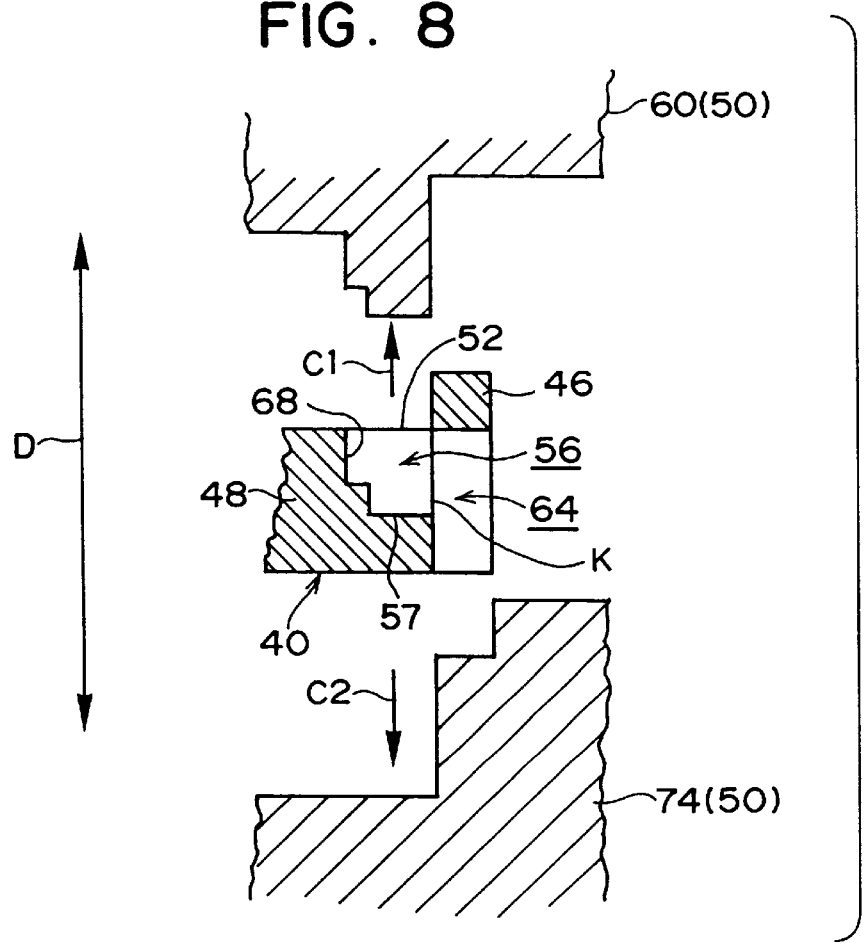
FIG. 8 is a schematic cross sectional view showing a forming method of an installation leg constituting the motor device according to the first embodiment of the present invention.
Figure 9:
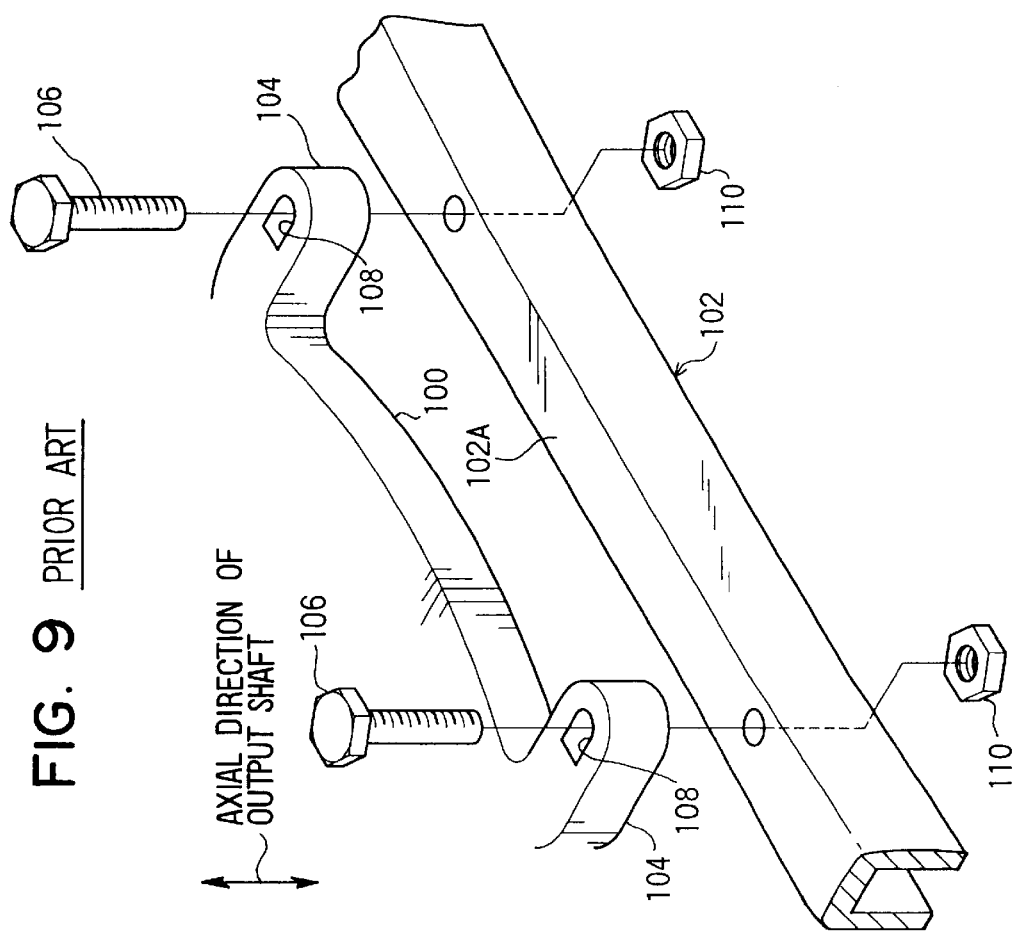
FIG. 9 is an exploded partial view showing a state that a conventional motor device is installed on a frame.
Figure 10:
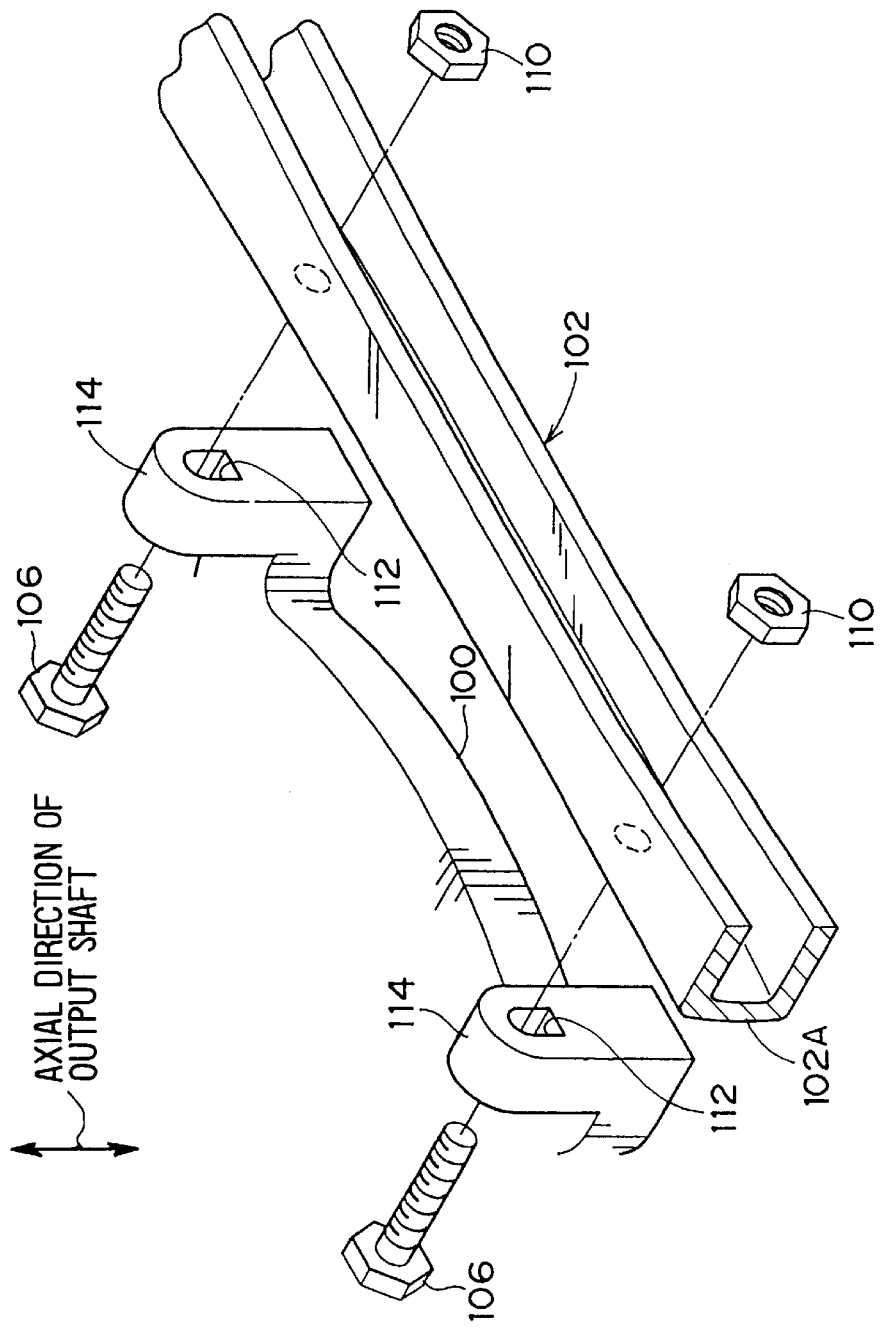
FIG. 10 is an exploded partial view showing a state that another conventional motor device is installed on a frame.

As shown in FIG. 8, when the die casting is carried out, the upper and lower dies 60 and 74 put together along a surface portion K so that no wall may be made at the surface portion K. As a result, each of the installation legs 40 is provided with a communication path extending from the through hole 64 to the nut holding portion 56 perpendicularly to the axial direction D of the output shaft 82. The communication path mentioned above may be formed only by the upper and lower dies without using a special moving core in the dies so that the gear housing 44 may be manufactured at lower cost.

While the gear housing 44 so manufactured houses the reduction mechanism for deducing the rotation speed of the motor 42, the installation legs 40 of the gear housing 44 are fixed to the pipe frame 24 by fastening perpendicularly to the axial direction D of the output shaft 82 in a manner that a holding surface of the nut holding portion 56 is opened in the opposing direction to the gravity.

In other words, as shown in FIGS. 6 and 7, after the installation piece 46 of the installation leg 40 comes in face contact with the flat installation seat 34, the bolt 62 is inserted into the through hole 64 through the installation hole 36 of the pipe frame 24 via washer (not shown in the drawing). Further, the bolt 62 inserted into the through hole 64 is screwed to the nut 54 primarily housed in the nut holding portion 56 by further passing through the through hole 64.

As the nut folding portion 56 is opened in the opposing direction to the gravity, the nut 54 may be inserted to be housed into the nut holding portion 56 by its own weight. Further, it is not necessary to have some means for preventing the nut 54 from falling down from the gear housing, which is beneficial from manufacturing cost and time standpoints.

Furthermore, as the outer surface of the nut 54 housed in the nut holding portion 56 is retained by the side wall of the nut holding portion 56, the nut 54 is prevented from rotating together with the bolt 62, when screwed. Moreover, as the leading end of the bolt 62 penetrated through the nut 54 may be housed in the concave portion 68, rigid fastening may be assured, even if a length of the bolt 62 fluctuates.

Furthermore, since the nut 54 is fastened with the bolt 62 in a manner that the inner surface 80 of the nut holding portion 56 serves as a contacting seat, the motor device 38 is fixed rigidly to the pipe frame 24.

Next, a motor device according to a second embodiment of the present invention is described. Components and parts common to those of the motor device according to the first embodiment have same reference numbers and the explanation thereof is omitted.

Figure 11:
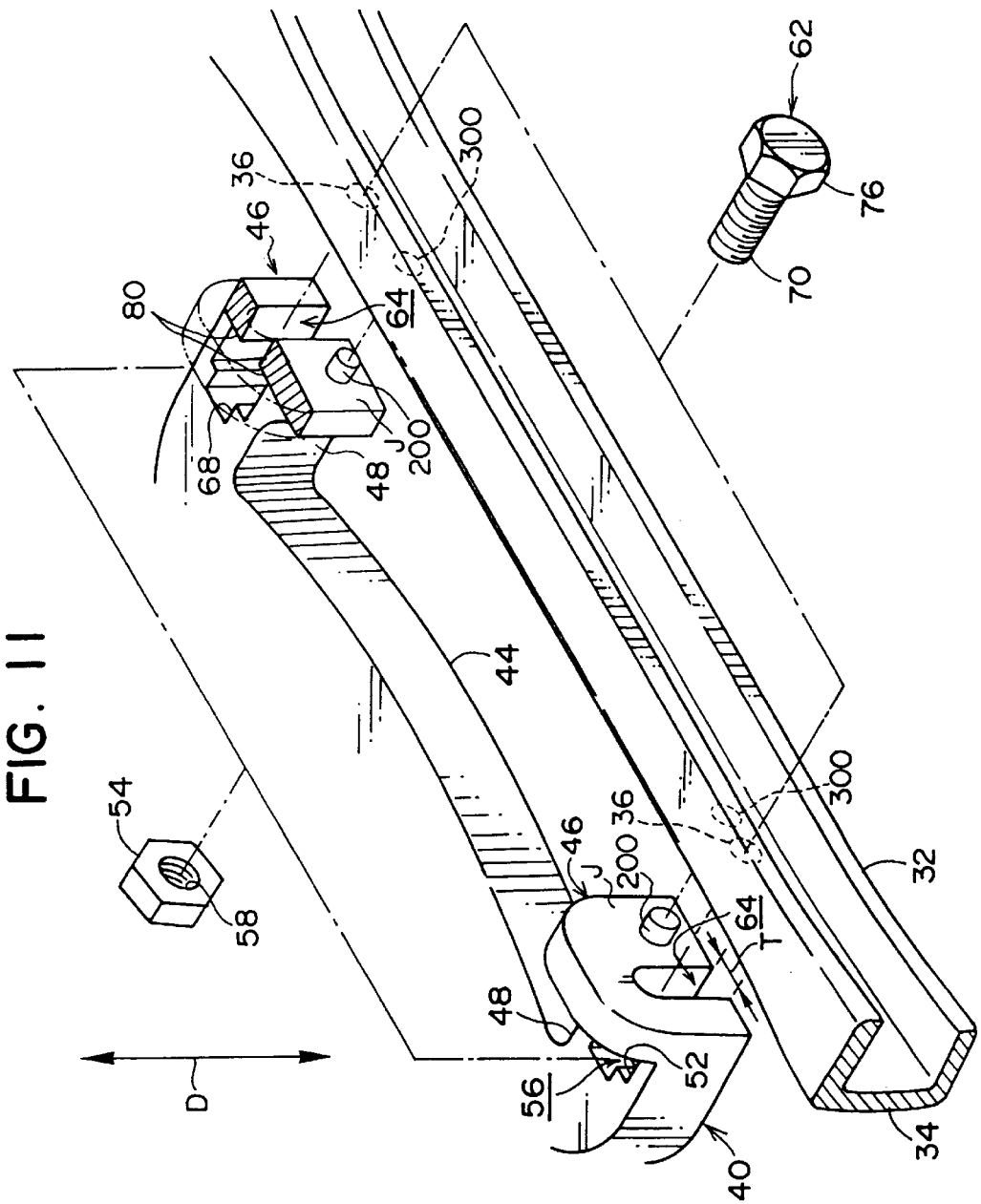
FIG. 11 is an exploded partial view showing a state that a motor device according to a second embodiment of the present invention is installed on a frame.

FIG. 11 is an exploded partial view showing a state that the gear housing 44 of the motor device according to the second embodiment is installed on the pipe frame 24.

As shown in FIG. 11, a column shaped projection 200 is provided at a surface J of the installation piece 46 which comes in face contact with the flat installation seat 34 when the gear housing 44 is fixed to the pipe frame 24. The projection 200 is formed nearly perpendicularly to the axial direction D of the output shaft 82 similarly to the through hole 64.

On the other hand, the flat installation seat 34 is provided with a fitting hole 300 into which the projection 200 is inserted.

With the construction mentioned above, when the gear housing 44 is fixed to the pipe frame 24, fitting the projection 200 into the fitting hole 300 automatically makes the through hole 64 position relatively to the installation hole 36. Further, the fitting of the projection 200 to the fitting hole 300 serves to prevent the fastening by the bolt 62 from being loosed during actual use of the motor device.

It is troublesome to carry out the fastening work, keeping an adequate position of the through hole 64 relative to the installation hole 36. However, primary fitting of the projection 200 to the fitting hole 300 makes it possible to easily position the through hole 64 relatively to the installation hole 36 and to keep the position during the fastening work, thus resulting in improving productivity.

Further, when the pipe frame 24 receives bending stresses repeatedly during the actual use of the motor device, a repeated slight rotation of the motor device 38 relative to the pipe frame 24 is likely to occur and, thereby, to cause to loose the fastening of the installation leg 40 with the pipe frame 24 by the bolt 62. When the installation leg 40 and the pipe frame 24 are held at least at two points of the projections 200 and/or the bolts 62, the relative rotation of the installation leg 40 to the pipe frame 24 does not occurs so that loosing the bolt may be prevented. A plurality of the projections 200 and fitting holes 300 may be provided correspondingly to each of the installation legs 40.

What is claimed is:

1. A motor device to be fixed to a frame having a seat surface and an installation hole by a bolt and a nut, the motor device having a motor, a reduction mechanism having an output shaft for reducing a rotation speed of the motor and a housing containing the reduction mechanism so as to have the output shaft penetrate therethrough, the housing having an installation portion integrally formed therein by a pair of dies parting in an axial direction of the output shaft, the installation portion comprising:

a side surface to come in surface contact with the seat surface of the frame;

a first recess portion for holding the nut whose entire inner surface is opened at least on one side of the housing in the axial direction of the output shaft; and a second recess portion for inserting the bolt whose entire inner surface is opened on the other side of the housing in the axial direction of the output shaft and which extends from the side surface to the first recess portion nearly perpendicularly to the axial direction of the output shaft, wherein the housing may be fixed to the frame by inserting the bolt into the second recess portion through the installation hole of the frame and screwing the bolt into the nut housed in the first recess portion.

2. Motor device according to claim 1, wherein the inner surface of the first recess portion has a retaining surface coming in contact with an outer surface of the nut and preventing the nut from rotating together with the bolt when the bolt is screwed into the nut.

3. Motor device according to claim 2, wherein a width length of the first recess portion in a longitudinal direction of the frame is smaller than that of a maximum outer diameter of the nut but not smaller than that of a minimum outer diameter of the nut so that the nut may be prevented from rotating together with the bolt when the bolt is screwed into the nut.

4. Motor device according to claim 1, wherein the first recess portion is provided at the inner surface on a side opposite to the second recess portion with a concave portion in which a leading end of the bolt is housed when the bolt penetrates through the nut.

5. Motor device according to claim 1, wherein the inner surface of the first recess portion has a nut holding surface opened only on the one side of the housing in an opposing direction to a gravity so that, just by dropping the nut into the first recess portion, the nut may be housed in the first recess portion with its own weight.

6. Motor device according to claim 1, further comprising:

first and second positioning means provided at the side surface of the installation portion and at the seat surface of the frame, respectively, wherein fitting the first positioning means into the second positioning means makes the second recess portion automatically position relatively to the installation hole of the frame.

7. Motor device according to claim 6, wherein one of the first and second positioning means is a projection and the other of the first and second positioning means is a hole for fitting to the projection.

8. Motor device according to claim 1, wherein a width length of the second recess portion in a longitudinal direction of the frame is smaller than that of a minimum outer diameter of the nut so that the nut may come in contact with the inner surface of the first recess portion on a side of the second recess portion.

9. Motor device according to claim 1, wherein the first recess portion has a depth to an extent that the nut may be housed entirely in the first recess portion.

10. Motor device according to claim 1, wherein the frame is basically a pipe but has a one side open square shaped cross sectional portion at a longitudinal intermediate portion thereof, an outer intermediate surface of the one side open square shaped cross sectional portion constituting the seat surface.

11. Motor device of claim 1, wherein the motor device is included in a wiper apparatus comprising:

a plurality of pivot shafts to which respective arms and blades are attached;

a plurality of pivot holders respectively fixed to the frame for rotatably supporting each of the pivot shafts; and a link mechanism connecting the output shaft and each of the pivot shafts for transmitting a driving force of the motor to the respective arms and blades.

* * * * *